US008688548B2

(12) United States Patent
Vasten

(10) Patent No.: US 8,688,548 B2
(45) Date of Patent: Apr. 1, 2014

(54) NEGATIVE BALANCE MANAGEMENT

(75) Inventor: Brett Vasten, Highlands, CO (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

(21) Appl. No.: 13/211,030

(22) Filed: Aug. 16, 2011

(65) Prior Publication Data

US 2012/0016783 A1   Jan. 19, 2012

Related U.S. Application Data

(63) Continuation of application No. 12/109,182, filed on Apr. 24, 2008, now Pat. No. 8,024,238.

(51) Int. Cl.
*G07B 17/00* (2006.01)
*G07F 19/00* (2006.01)
*H04M 15/00* (2006.01)

(52) U.S. Cl.
USPC .............................................. 705/30; 705/34

(58) Field of Classification Search
USPC ...................................................... 705/30, 34
See application file for complete search history.

(56) References Cited

U.S. PATENT DOCUMENTS

| | | | |
|---|---|---|---|
| 8,024,238 B2 | 9/2011 | Vasten | |
| 2002/0091600 A1 | 7/2002 | Kravetz et al. | |
| 2004/0034588 A1 | 2/2004 | Arikawa et al. | |
| 2004/0054685 A1* | 3/2004 | Rahn et al. | 707/102 |
| 2004/0093281 A1* | 5/2004 | Silverstein et al. | 705/26 |
| 2004/0117298 A1* | 6/2004 | Algiene et al. | 705/39 |
| 2004/0128247 A1* | 7/2004 | Sato et al. | 705/41 |
| 2004/0249745 A1 | 12/2004 | Baaren | |
| 2005/0289026 A1 | 12/2005 | Dunn et al. | |
| 2006/0015363 A1 | 1/2006 | Allu et al. | |
| 2006/0106693 A1 | 5/2006 | Carlson et al. | |
| 2006/0218091 A1* | 9/2006 | Choy | 705/40 |
| 2007/0094137 A1* | 4/2007 | Phillips et al. | 705/40 |
| 2007/0100745 A1 | 5/2007 | Keiser et al. | |
| 2008/0103972 A1* | 5/2008 | Lanc | 705/44 |
| 2009/0043663 A1* | 2/2009 | Prater | 705/16 |
| 2009/0150266 A1 | 6/2009 | Dickelman | |

OTHER PUBLICATIONS

Anonymous; "Tarifica Analysis—Credit Transfer and Negative Balance Cell Options in the Portuguese Mobile Market," *Tarifica Alert*; May 30, 2006; n461, pp. 1-4.
Final Office Action mailed on Nov. 29, 2010 for U.S. Appl. No. 12/109,182, 8 pages.
International Search Report mailed on Dec. 22, 2009 for PCT Patent Application No. PCT/US2009/041352, 2 pages.
Non-Final Office Action mailed on Jun. 18, 2010 for U.S. Appl. No. 12/109,182, 8 pages.
Notice of Allowance mailed on May 17, 2011 for U.S. Appl. No. 12/109,182, 8 pages.

* cited by examiner

*Primary Examiner* — Seye Iwarere
(74) *Attorney, Agent, or Firm* — Kilpatrick Townsend & Stockton LLP

(57) ABSTRACT

A system, apparatus, and method for managing account data for accounts having a negative balance. The invention embodiment includes a method, process or workflow for processing data for accounts associated with a debit, credit, pre-paid card or other form of financial instrument that have a negative balance. The data processing includes application of issuer criteria or filters to determine if certain of the accounts having a negative balance are not suitable for chargeback processing and instead may be processed in bulk, thereby reducing administrative and data processing overhead. For each account that is potentially eligible for chargeback processing, the invention embodiment accesses the account data and determines if the data supports initiation of a chargeback procedure for one or more transactions described by the account data. If the account contains one or more transactions that are eligible for chargeback processing, then a provisional credit in the amount of the one or more transactions may be applied to the account.

26 Claims, 5 Drawing Sheets

NEGATIVE BALANCE MANAGEMENT

CROSS-REFERENCES TO RELATED APPLICATIONS

This application is a continuation of U.S. patent application Ser. No. 12/109,182, entitled "Negative Balance Management," filed on Apr. 24, 2008 now U.S. Pat. No. 8,024,238 for which is herein incorporated by reference in its entirety.

BACKGROUND

The present invention is directed to systems, apparatuses and methods for the management of pre-paid financial instruments such as gift cards, payroll cards, or some forms of debit card, and more specifically, to a system and associated apparatus and method for processing data associated with such instruments or cards in the situation in which the instrument or card has a negative balance.

Financial instruments such as debit cards or credit cards are used by millions of people worldwide to facilitate various types of commercial transactions. One form of debit card is a pre-paid card, that is a card or other data storage device that is "loaded" with a specified amount of funds for use by the possessor of the card. In such cards or data storage devices, the user is provided with a certain amount of credit or purchasing power that they may use to purchase goods and services. As they utilize the funds credited to the card or device, the cost of the purchased goods or services is deducted from the card or device. In this way, the account data reflects a running balance of the funds available on the card or device. The balance information may be used by a consumer to determine how much they have remaining on the card that they can spend, or by a merchant to determine if a consumer has sufficient funds available to complete a desired transaction.

There are multiple types of pre-paid cards or data storage devices possible; two of the most common are gift cards and payroll cards. Gift cards are financial instruments that initially contain a fixed amount of funds and generally cannot be loaded with additional funds; that is, they are typically not able to be recharged or reloaded with additional funds. Payroll cards are a form of re-loadable financial instrument that may be used by an employer to provide an employee with a form of electronic paycheck. Such cards may be reloaded by the employer on a regular basis, with the employee then using the card to make purchases anywhere the card is accepted.

Although in theory such financial instruments should not be able to be used to purchase goods or services in situations where the instrument does not contain sufficient funds for the transaction, there are certain situations where a negative balance may be caused to occur in the account associated with the instrument. A negative balance may occur, for example, as a result of a multi-part transaction where the balance is caused to become close to zero by a first part of the transaction and a second part of the transaction occurs subsequently and without formal authorization, causing the balance to drop below zero. One such transaction might be the use of a gift card at a restaurant. Although the initial part of the transaction is a bill for a meal and requires authorization based on verifying a sufficient balance on the card, the cardholder might then leave a gratuity for the server as part of the transaction. If the gratuity is greater than the amount of funds remaining on the card after payment for the meal, then the balance of the card may become negative.

Another example of a situation in which a pre-paid card or other form of financial instrument might be caused to have a negative balance is when a payroll card balance falls below zero prior to being reloaded by an employer. This might occur, for example, because an employee uses the card to pay for more goods and services than they currently have funds for while waiting for their next paycheck. This situation may be permitted by the card issuer and employer to enable the employee to better manage their needs and cash flow since expenses typically vary from month to month.

As discussed, there are situations in which a pre-paid financial instrument such as a gift or payroll card may be caused to have a negative balance. In some situations, the negative balance may be eligible for a chargeback process, in which a portion or all of the amount of the negative balance may be credited to the merchant who accepted the transaction, or to the issuer of the instrument. Similarly, there may be situations in which a portion or all of the amount of the negative balance may be determined to be the responsibility of the merchant or issuer (one or both of whom may have failed to follow the proper authorization process or adhere to the agreed upon rules for handling such cards); in such cases the responsible party is denied a chargeback and must bear the loss represented by the negative balance.

Processing of negative balance pre-paid cards or similar financial instruments is made complicated by the need to consider a variety of factors when determining if a particular transaction is eligible for chargeback. Such factors include the issuer criteria for initiating a chargeback and the payment processing system regulations governing the chargeback process, as well as any merchant or issuer agreements with the payment processor.

What is desired is a system, apparatus and method for handling negative balance situations for pre-paid cards or other financial instruments.

BRIEF SUMMARY

Embodiments of the present invention are directed to a system, apparatus, and method for handling negative balance situations for pre-paid cards or financial instruments, such as gift cards or payroll cards. In some embodiments, an embodiment of the invention includes a method, process or workflow for processing data for accounts associated with a debit, credit, pre-paid card or other form of financial instrument that have a negative balance. The data processing includes application of issuer criteria or filters to determine if certain of the accounts having a negative balance are not suitable for chargeback processing and instead may be processed in bulk, thereby reducing administrative and data processing overhead. For each account that is potentially eligible for chargeback processing, an embodiment of the invention accesses the account data and determines if the data supports initiation of a chargeback procedure for one or more transactions described by the account data. If the account contains one or more transactions that are eligible for chargeback processing, then a provisional credit in the amount of the one or more transactions may be applied to the account.

In one embodiment, the present invention is directed to a method of managing account data for an account having a negative balance, where the method comprises: accessing account data for a plurality of accounts, wherein each of the plurality of accounts has a negative balance; determining if some of the plurality of accounts are suitable for bulk processing; if it is determined that some of the accounts are suitable for bulk processing, then performing a bulk processing operation on those accounts; allowing selection of one of the plurality of accounts that are not suitable for bulk processing for individual processing; accessing the account data for the account selected for individual processing; determining if the account selected for individual processing is eligible for chargeback processing; if it is determined that the account selected for individual processing is eligible for chargeback processing, then initiating a chargeback process for the account; and if it is determined that the account selected for individual processing is not eligible for chargeback processing, then adjusting the account balance to zero.

In another embodiment, the present invention is directed to an apparatus for managing account data for an account having a negative balance, where the apparatus comprises: a processor configured to execute a set of instructions; a memory coupled to the processor for storing the set of instructions; and the set of instructions stored in the memory, wherein when executed by the processor the instructions implement a method to access account data for a plurality of accounts, wherein each of the plurality of accounts has a negative balance; determine if some of the plurality of accounts are suitable for bulk processing; if it is determined that some of the accounts are suitable for bulk processing, then performing a bulk processing operation on those accounts; allow selection of one of the plurality of accounts that are not suitable for bulk processing for individual processing; access the account data for the account selected for individual processing; determine if the account selected for individual processing is eligible for chargeback processing; if it is determined that the account selected for individual processing is eligible for chargeback processing, then initiating a chargeback process for the account; and if it is determined that the account selected for individual processing is not eligible for chargeback processing, then adjusting the account balance to zero.

In yet another embodiment, the present invention is directed to a computer program product, where the computer program product comprises: a computer readable medium encoded with a set of instructions, which when executed by a processor implement a method to manage account data for an account having a negative balance, the method further comprising accessing account data for a plurality of accounts, wherein each of the plurality of accounts has a negative balance; determining if some of the plurality of accounts are suitable for bulk processing; if it is determined that some of the accounts are suitable for bulk processing, then performing a bulk processing operation on those accounts; allowing selection of one of the plurality of accounts that are not suitable for bulk processing for individual processing; accessing the account data for the account selected for individual processing; determining if the account selected for individual processing is eligible for chargeback processing; if it is determined that the account selected for individual processing is eligible for chargeback processing, then initiating a chargeback process for the account; and if it is determined that the account selected for individual processing is not eligible for chargeback processing, then adjusting the account balance to zero.

Other objects and advantages of the present invention will be apparent to one of ordinary skill in the art upon review of the detailed description of the present invention and the included figures.

DETAILED DESCRIPTION

The present invention is directed to a system, apparatus, and method for processing pre-paid cards or other financial instruments that have a negative balance. In some embodiments, the invention is directed a workflow that is practiced by an operator of a payment processing system, and may be implemented in form of a set of software instructions executed by a processing device.

Figure 3:
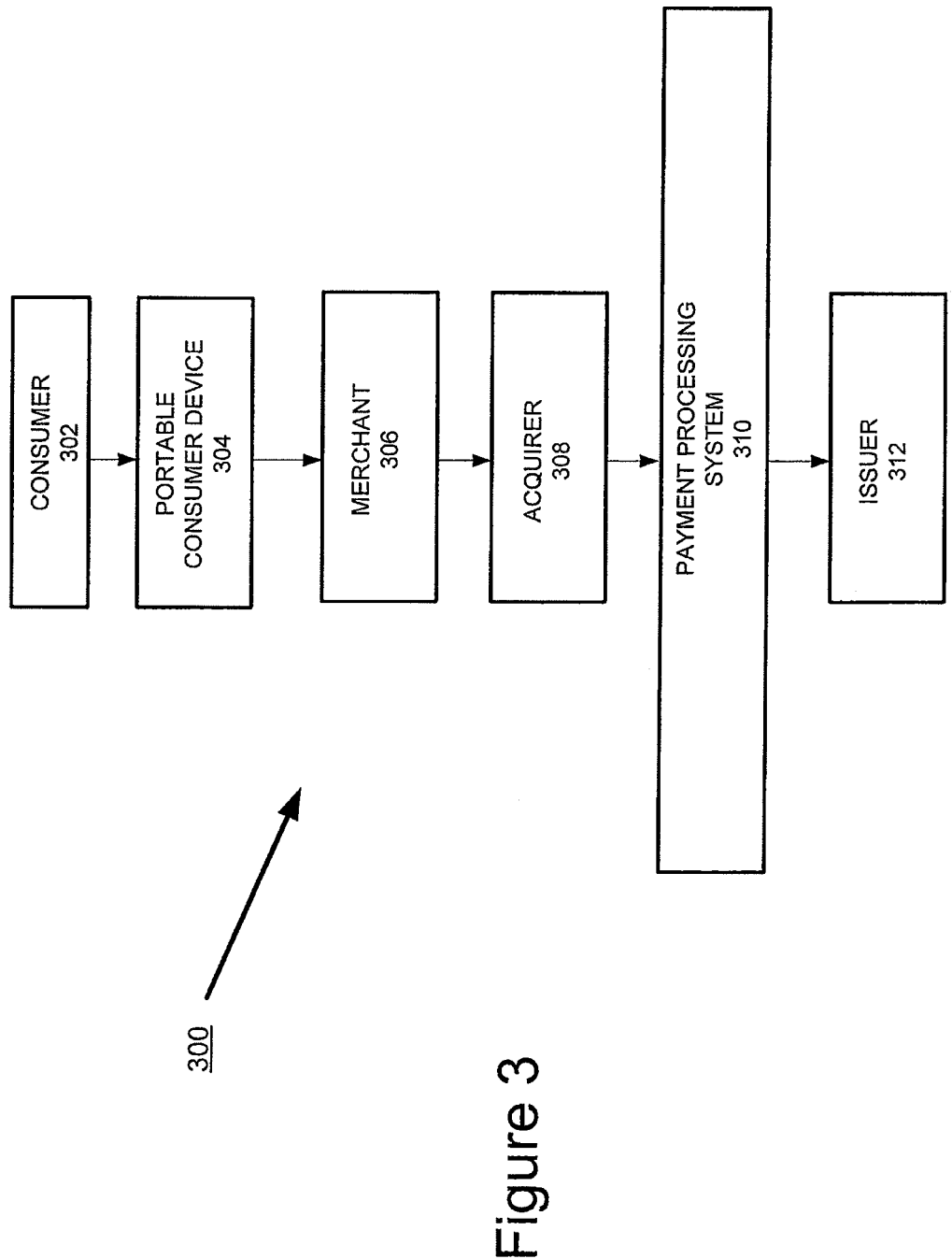
FIG. 3 is a functional block diagram illustrating the primary functional elements of a payment system that utilizes a portable consumer device.

Prior to describing an embodiment of the invention in greater detail, a brief discussion of the entities involved in a transaction and their roles in the chargeback process will be presented with regards to FIG. 3, which is a functional block diagram illustrating the primary functional elements of a payment system 300 that utilizes a portable consumer device. As shown in FIG. 3, a consumer 302 desires to engage in a purchase of a good or service, with payment made using a portable consumer device 304. Portable consumer device 304 may take the form of a card having a magnetic strip encoded with account data (such as a standard credit or debit card), or other suitable form of data storage device (such as a mobile phone, PDA, or transportable memory device). Portable consumer device 304 may be presented to a Merchant 306 at a point of sale (POS) or indirectly via a scanning device, or by providing identification information over a network connection. Merchant 306 processes the transaction using account data obtained directly or indirectly from consumer device 304; if necessary, this data may be used in conjunction with additional consumer data (such as identification data, authorization data, or security data) in order to complete the transaction. Typically, an electronic payment transaction is authorized if the consumer conducting the transaction is properly authenticated and has sufficient funds or credit to conduct the transaction. Conversely, if there are insufficient funds or credit in the consumer's account, or if the consumer's portable consumer device is on a negative list (e.g., it is indicated as possibly stolen), then an electronic payment transaction may not be authorized.

In standard operation, an authorization request message is created during or after a consumer purchase of a good or service at a point of sale (POS) using the portable consumer device 304 (e.g., a credit or debit card that includes encoded data). In some embodiments, the portable consumer device may be a wireless phone, PDA, laptop computer, or transportable data storage device (such as flash memory). The authorization request message can be sent from a POS terminal located at a merchant place of business 306 to the merchant's Acquirer 308, to a Payment Processing System 310, and then to an Issuer 312. An "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised.

As mentioned, the transaction related data is provided by Merchant 306 to Acquirer 308, which in most situations is a bank, financial institution, credit union or other institution responsible for some or all of the account management and/or processing of Merchant's financial transactions. Acquirer 308 provides some or all of the transaction related data to Payment Processing System 310, which may be a transaction clearance system or similar entity. After processing of the transaction, Payment Processing System 310 may provide some or all of the transaction and related data to Issuer 312, where Issuer 312 may take the form of a bank, financial institution or other business entity that issued device 304 and provided device 304 to consumer 302.

As mentioned, portable consumer device 304 may take one of several suitable forms. In the example of the portable consumer device being a mobile device, the device may include a contactless element such as a chip for storing payment data (e.g., a BIN number, account number, etc.) and a wireless data transfer (e.g., transmission) element such as an antenna, a light emitting diode, a laser, etc.). The portable consumer device may also be, for example, a keychain device (such as the Speedpass™ commercially available from Exxon-Mobil Corp.), etc. The device containing the chip or other data storage element may be a cellular phone, personal digital assistant (PDAs), pager, transponder, or the like. The portable consumer device may incorporate the ability to perform debit functions (e.g., a debit card), credit functions (e.g., a credit card), or stored value functions (e.g., a pre-paid or stored value card).

Payment processing system 310 may include data processing subsystems, networks, and other means of implementing operations used to support and deliver authorization services, exception file services, and clearing and settlement services for payment transactions. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment processing system 310 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment processing system 310 may use any suitable wired or wireless network, including the Internet. Among other functions, payment processing system 310 may be responsible for ensuring that a user is authorized to conduct the transaction (via an authentication process), confirm the identity of a party to a transaction (via receipt of a personal identification number), confirm a sufficient balance or credit line to permit a purchase, and reconcile the amount of purchase with the user's account (via entering a record of the transaction amount, date, etc.).

Merchant 306 may be associated with a physical location and will typically have a physical point of sale (POS) terminal that can interact with portable consumer device 304. Merchant 306 may also or instead be associated with a virtual location (such a web-site) and have a virtual POS terminal or interface via which data may be entered by a user as part of a transaction. For a physical POS terminal, any suitable point of sale terminal may be used, including device (e.g., card) readers. The device readers may include any suitable contact or contactless mode of operation. For example, exemplary card readers can include RF (radio frequency) antennas, magnetic stripe readers, etc., to interact with portable consumer device 304.

When a negative balance arises, payment processing system 310 must determine what to do about the account in question and how to allocate the loss represented by the negative balance among the participants to the transaction. Typically, if the transaction is eligible for a chargeback (so that the issuer or merchant may be able to recover some or all of the negative amount), then the issuer will desire that a chargeback procedure be initiated. However, as will be discussed, this is not always the case, and even if such a procedure is desired by the issuer, other factors may prevent a chargeback from occurring.

Figure 1A:
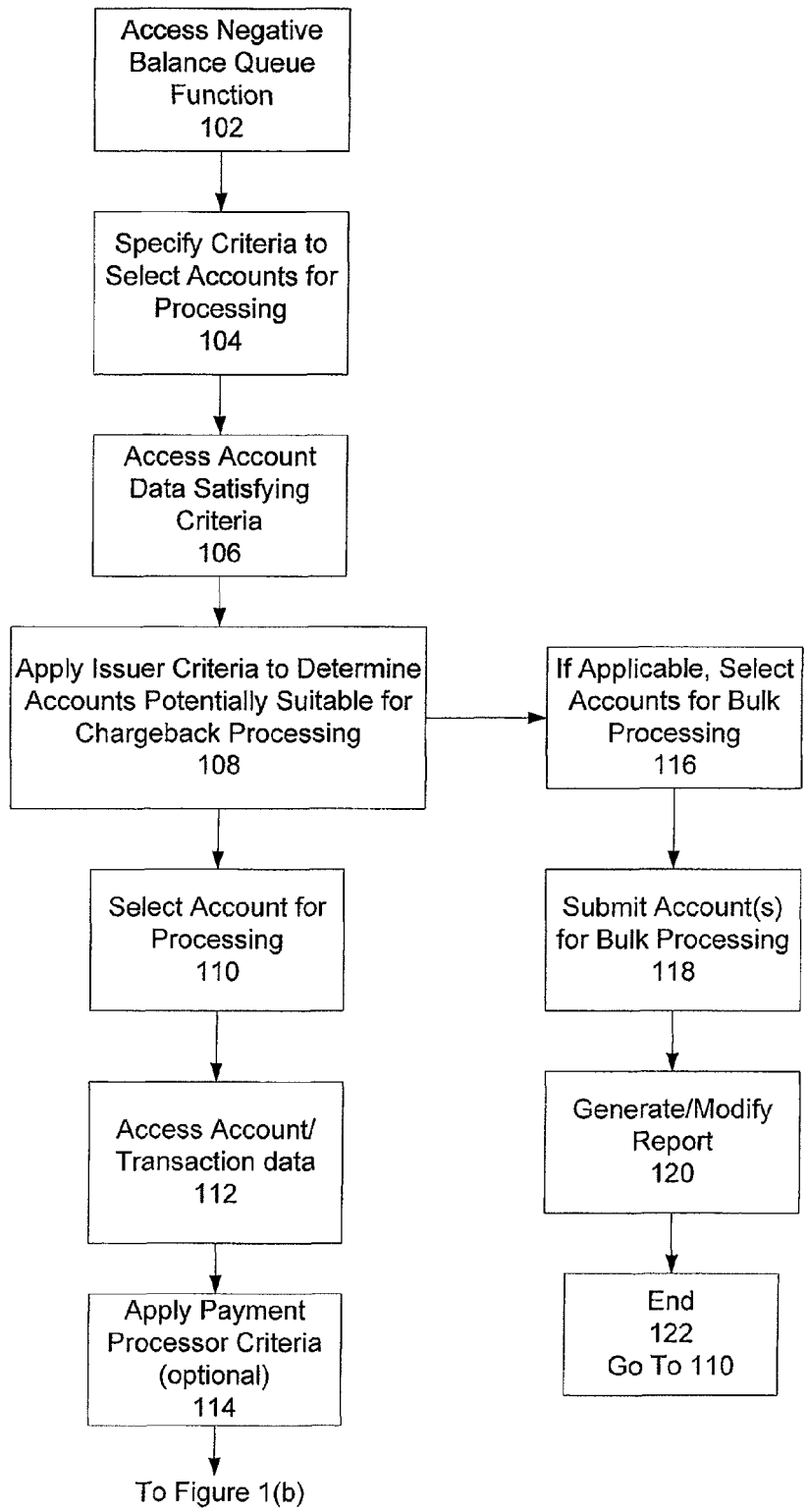
FIGS. 1(a) and 1(b) are a flowchart of a method, process or workflow for processing account data for financial instruments (such as pre-paid cards) having a negative balance, in accordance with some embodiments of the present invention.
Figure 1B:
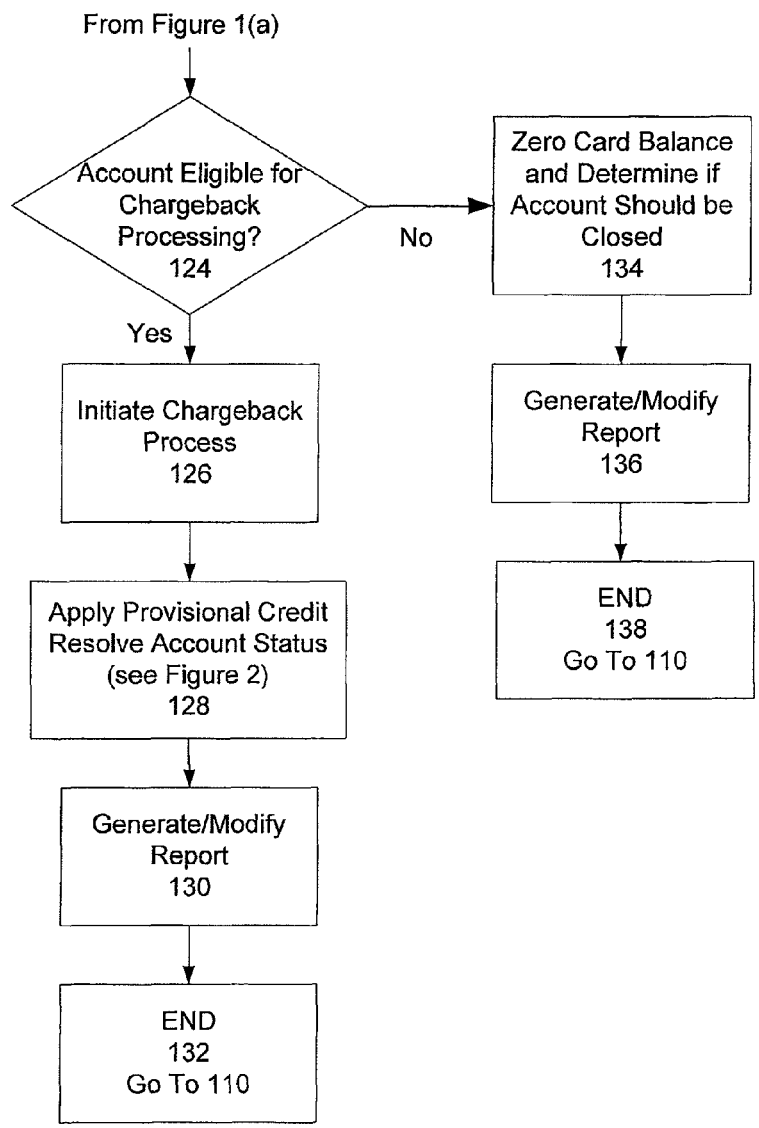

FIGS. 1(a) and 1(b) are a flowchart of a method, process or workflow for processing account data for financial instruments (such as pre-paid cards) having a negative balance, in accordance with some embodiments of the present invention. The method, process or workflow to be described with reference to FIGS. 1(a) and 1(b) will typically be performed by a user or operator of payment processing system 310. As shown in FIG. 1(a), the process begins at stage 102 where the method, process or workflow is initiated. This may occur, for example, by accessing the account identification or other account information for a plurality of accounts having a negative balance. It may also be initiated by accessing or executing a negative balance processing function that retrieves, for example, a set of data for multiple accounts having a negative balance.

At stage 104 a user may enter criteria that are used to select which of the accounts having a negative balance are to be the subject of further processing. Examples of such criteria include, but are not limited to, the number of days for which the account has had a negative balance, the type of financial instrument (e.g., gift card, payroll card), the issuer of the card (e.g., a specified financial institution), or a range of negative balance values (e.g., negative $10 to negative $0.01). In response to the criteria, the process or workflow will access the negative account balance data satisfying the criteria and present that data to the user (as shown at stage 106).

At stage 108, the method, process or workflow applies relevant issuer defined criteria to determine accounts potentially suitable for chargeback processing. These criteria represent, for example, rules, conditions, or other forms of filters to determine accounts or transactions that an issuer may desire to remove from consideration for chargeback processing by the payment processing system. One example of such a rule, condition or filter is based on an issuer's desire to only consider an account for chargeback processing when the negative balance amount for that account is greater than the cost of chargeback processing (or exceeds that cost by some amount). This rule ensures that chargeback processing is not initiated for an account when the possible recovery is less than the cost of the chargeback processing (or does not exceed that cost by a specified amount). Another possible rule or criteria is to exclude an account for chargeback processing when the amount of the negative balance is less than an amount equal to a "business minimum", with the business minimum amount being determined by one or more operational or management considerations of the issuer (which may vary with time, season, competitive environment, or other operational or financial conditions). A further possible rule or criteria is to exclude an account for consideration for chargeback processing when the negative balance resulted from application of a cardholder fee. Other rules, criteria or filters are possible and the previous list is not intended to be exhaustive.

If an account or set of accounts are not suitable candidates for chargeback processing (as a result of application of an issuer criteria or for some reason that renders that account or accounts not eligible for chargeback processing), then those accounts may be processed in bulk (as indicated at stage 116). Bulk processing permits a user of the payment processing system to process multiple accounts in fewer operations (sometimes as few as a single operation), instead of processing multiple individual accounts. In the situation of multiple accounts having a negative balance, such bulk processing may take the form of selecting the accounts for processing (as at stage 116, using a check box or other user interface tool, for example) and submitting the selected accounts to the payment processing system for bulk processing (at stage 118). At this point the payment processing system may automatically adjust the balance on the submitted accounts to zero (as may be indicated by application of a credit in a sufficient amount to such accounts) and include the accounts on a report generated by the system (stage 120). This would terminate the bulk processing stages of the overall payment processing (stage 122).

For accounts or transactions that are not removed from consideration for chargeback processing at stage 108, the method, process or workflow then enables the user to select an individual account or transaction for negative balance processing (stage 110). Selection of an individual account may be by means of a check box or other user interface tool. Next, at stage 112, the method or process enables the user to access the account or transaction data. This may be accomplished by any suitable means; for example, activation of a link embedded in an account or transaction report. The link may be associated with the account number, negative balance amount, or other data on the report. Activation of the link (or use of other data access method) will typically result in retrieval of data from a data storage location and presentation of that data to the user. This data may include authorization and settlement data, for example, for the account, for a transaction, or for multiple transactions associated with the account.

At stage 114, the process or method may apply any relevant rules, criteria or filters specified by the payment processor to determine whether the selected account or transaction should be removed from consideration for further processing. Such criteria may take the form of rules, conditions, or other suitable filters, for example. Examples of such criteria may include, for example, the amount of the transaction, the number of days the account has been negative, and the amount the account is negative.

Continuing with reference to FIG. 1(*b*), the process or method next determines if the account or transaction is eligible for chargeback processing (at stage 124) as determined by the payment processor's chargeback policies. For example, at this stage a user of the payment processing system may determine if the account record contains data regarding a transaction that is eligible for chargeback processing (in accordance with the payment processor's chargeback criteria, or other relevant rules or conditions, etc.). If the account or transaction is eligible for chargeback processing, then the chargeback process is initiated (stage 126). This may involve, for example, execution of a dedicated computer program or sequence of instructions that implement a method, process, or workflow for processing account or transaction related data to carry out a chargeback process for an issuer. The chargeback processing may include, for example, selection by the user of a reason or justification for the chargeback. Examples of such reasons or justifications, include, but are not limited to, the merchant category code associated with the transaction, the difference between the authorization value and the settlement value, and the amount of time between the authorization and the settlement transaction.

Figure 2:
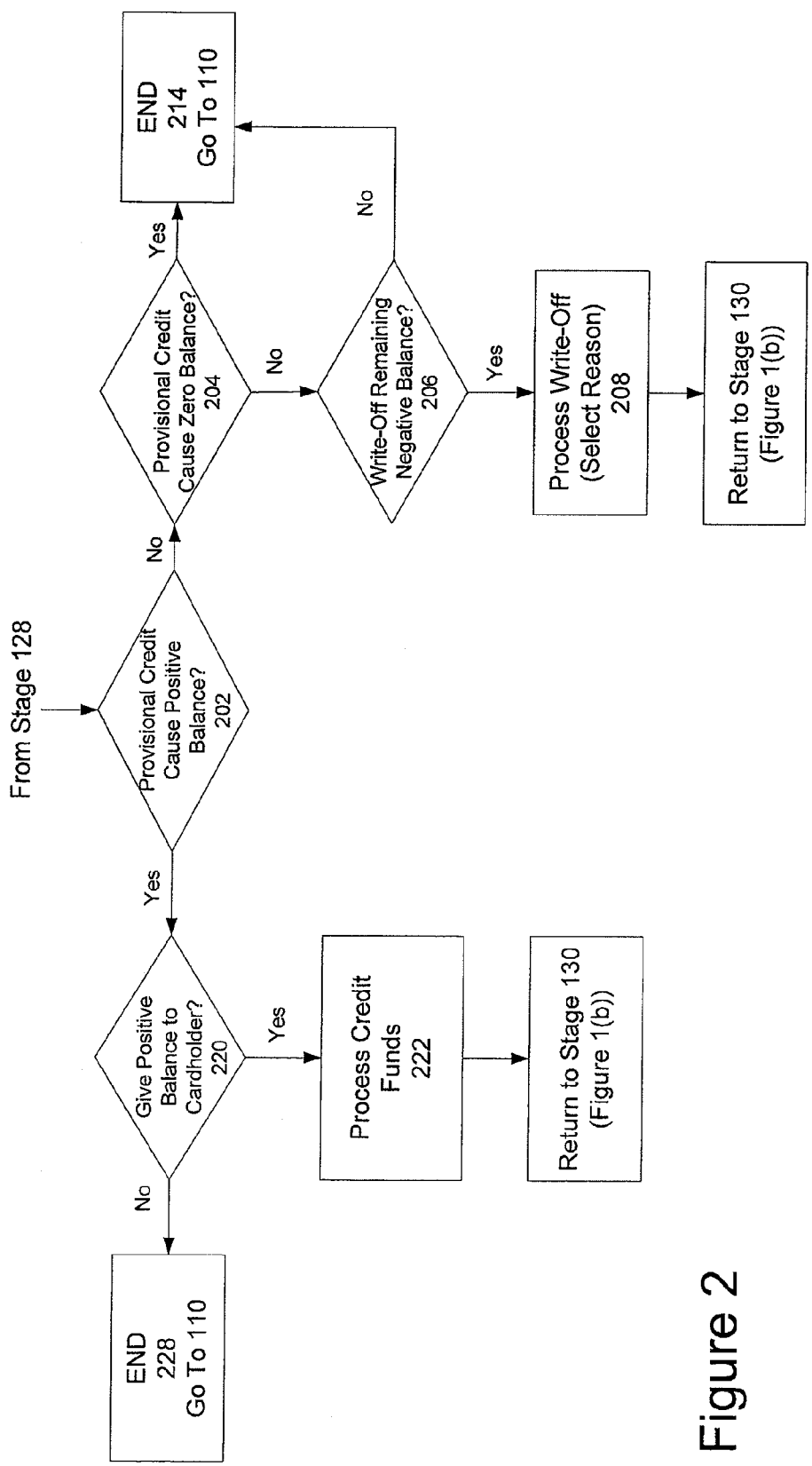
FIG. 2 is a flowchart of a method, process, or workflow for applying a provisional credit and resolving an account status as part of processing account data for financial instruments having a negative balance, in accordance with some embodiments of the present invention.

As part of the chargeback process, it is typical for a provisional credit to be applied to the account having the negative balance (stage 128, and described in greater detail with reference to FIG. 2). This provisional credit is typically in the amount of the transaction that an issuer submitted for chargeback (which may have caused the account to have a negative balance), and application of the provisional credit may require that the status of the account be resolved. In this situation, application of the chargeback process has enabled the issuer to recover an amount that otherwise would represent a loss.

Continuing with reference to stage 124 of FIG. 1(*b*), if the account or transaction is not eligible for chargeback processing, then the process, method or workflow will cause the account to have a balance of zero (stage 134) and determine if the account should be closed or subject to another action (such as being placed on a "watch" list). Closing the account may be decided upon for any one of several suitable reasons; for example, the account may be closed because it has been dormant for a specified period of time. After the account balance is set to zero, the account and any relevant account or transaction related data may be added to or used to generate a "write-off" or other form of report (stage 136). This report contains a list of accounts that represent losses to the issuer, as they are accounts in which a negative balance resulted from transactions for which the payment processor will not credit the issuer or cardholder. Included in the report may be a reason or justification selected by the user for why the account or transaction is not eligible for chargeback processing. Examples of such reasons or justifications, include, but are not limited to: fraud, that the negative balance resulted from a gratuity, that the negative balance resulted from application of a justified fee, etc. At this point, processing of the account will end (stage 138), and if desired, control may then be passed to stage 110 of FIG. 1(*a*) to enable a user to select another account for processing.

Continuing with reference to stage 128 of FIG. 1(*b*), if the account is eligible for chargeback processing, then application of a provisional credit to the account may have several results and place the account balance into one of several conditions. These are described in greater detail with reference with to FIG. 2, which is a flowchart of a method, process or workflow for applying a provisional credit and resolving an account status as part of processing account data for financial instruments having a negative balance, in accordance with some embodiments of the present invention.

As mentioned with reference to stage 128 of FIG. 1(*b*), a provisional credit may be applied to an account as part of the chargeback processing. The amount of the provisional credit will typically be equal to the amount of the transaction or transactions that are eligible for chargeback processing. As shown in FIG. 2, the method, process or workflow determines if application of the provisional credit caused the account to have a positive balance (stage 202). If it is determined that application of the provisional credit caused the account to have a positive balance, then a decision is made as to whether to provide the positive balance amount to the cardholder (at stage 220). The Issuer of the prepaid card typically makes this decision based on their internal audit guidelines. If it is decided not to provide the positive balance amount to the cardholder, then this part of the process terminates (stage 228). If desired, control may then be passed to stage 110 of FIG. 1(*a*) to enable a user to select another account for processing. If it is decided to provide the positive balance amount to the cardholder, then a credit to the cardholder account is processed (stage 222), and control is then passed to stage 130 of FIG. 1(b), where a chargeback, credit or other form of report or record may be generated or modified. This part of the process then terminates (stage 132) and if desired, control may then be passed to stage 110 of FIG. 1(a) to enable a user to select another account for processing.

If at stage 202, it is determined that application of the provisional credit did not cause the account to have a positive balance, then it is determined whether application of the provisional credit caused the account to have a zero balance (stage 204). If it is determined that application of the provisional credit caused the account to have a zero balance, then this part of the process is terminated (stage 214), and if desired, control may then be passed to stage 110 of FIG. 1(a) to enable a user to select another account for processing. If at stage 204 it is determined that application of the provisional credit did not cause the account to have a zero balance, then it is determined whether to write-off the remaining negative balance (stage 206). If it is decided not to write-off the remaining negative balance, then this part of the process terminates (stage 214) and if desired, control may then be passed to stage 110 of FIG. 1(a) to enable a user to select another account for processing. If at stage 206 it is decided to write-off the remaining negative balance, then the write-off is processed (stage 208), which typically includes selection of a reason or justification for the write-off. Examples of such reasons or justifications, include, but are not limited to: that the remaining negative balance is below a business minimum of the issuer, that the remaining amount is not eligible for chargeback processing, or that the remaining amount is fee related. Control is then passed to stage 130 of FIG. 1(b), where a chargeback, credit or other form of report or record may be generated or modified.

Returning to stage 130 of FIG. 1(b), after generation or modification of a chargeback, credit or other form of report or record, processing of the account selected for chargeback processing terminates (stage 132). If desired, control may then be passed to stage 110 of FIG. 1(a) to enable a user to select another account for processing.

Note that after application of a provisional credit or other action that brings an account balance to zero, the account in question may be closed, placed on a "watch" list, or be the subject of another suitable action by the payment processor.

Figure 4:
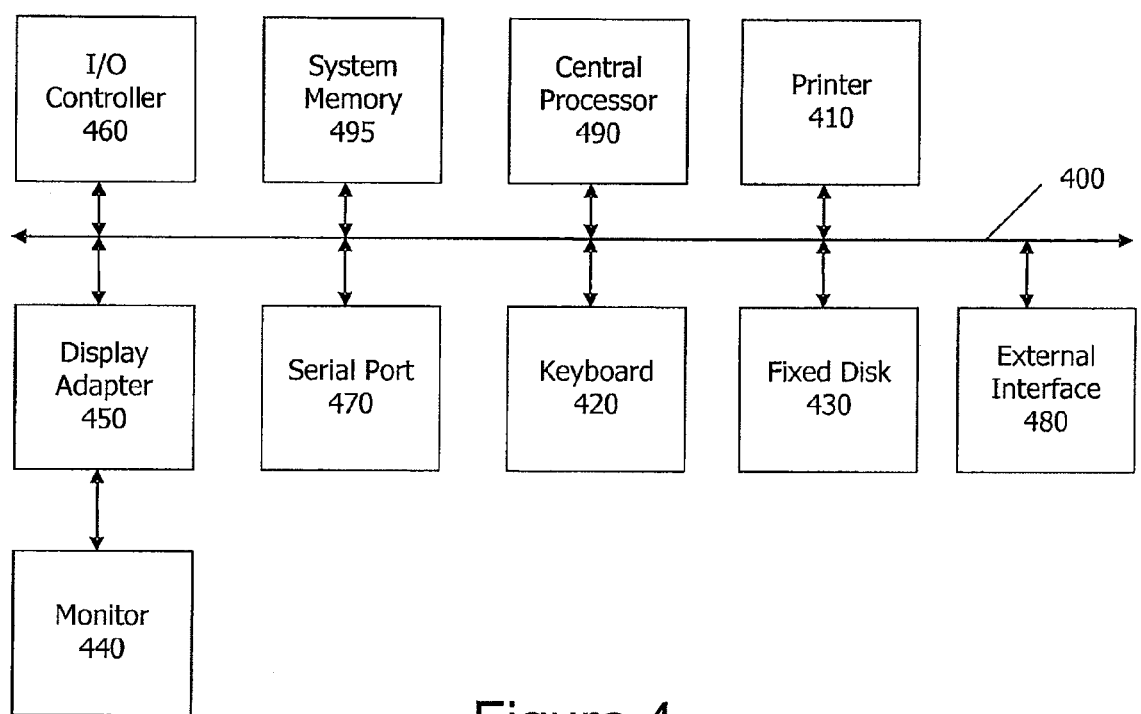
FIG. 4 is a block diagram of elements that may be present in a computer device or system configured to execute a method, process or workflow for managing negative balances in accordance with some embodiments of the invention.

In some embodiments, the inventive method, process or workflow for processing of negative account balances may be wholly or partially implemented in the form of a set of instructions are executed by a central processing unit (CPU) or microprocessor. As an example, FIG. 4 shows a block diagram of elements that may be present in a computer device or system configured to execute a method, process, or workflow for managing negative balances in accordance with some embodiments of the invention. The subsystems shown in FIG. 4 are interconnected via a system bus 400. Additional subsystems such as a printer 410, a keyboard 420, a fixed disk 430, a monitor 440, which is coupled to a display adapter 450, and others are shown. Peripherals and input/output (I/O) devices, which couple to an I/O controller 460, can be connected to the computer system by any number of means known in the art, such as a serial port 470. For example, the serial port 470 or an external interface 480 can be used to connect the computer apparatus to a wide area network such as the Internet, a mouse input device, or a scanner. The interconnection via the system bus 400 allows a central processor 490 to communicate with each subsystem and to control the execution of instructions that may be stored in a system memory 495 or the fixed disk 430, as well as the exchange of information between subsystems. The system memory 495 and/or the fixed disk 430 may embody a computer readable medium.

In accordance with the present invention there have been described a system, apparatus, and methods for managing accounts having a negative balance. The invention embodiment includes a method, process or workflow for processing data for accounts associated with a debit, credit, pre-paid card or other form of financial instrument that has a negative balance. The data processing includes application of issuer criteria or filters to determine if certain of the accounts having a negative balance are not suitable for chargeback processing and instead may be processed in bulk. For each account that is potentially eligible for chargeback processing, the invention embodiment accesses the account data and determines if the data supports initiation of a chargeback procedure for one or more transactions described by the account data. If the account contains one or more transactions that are eligible for chargeback processing, then a provisional credit in the amount of the one or more transactions may be applied to the account.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method of managing account data for a set of financial instrument accounts, the method comprising:
   identifying a set of financial instrument accounts that have a negative balance;
   accessing account data for the set of accounts;
   determining a subset of accounts from the set of accounts that are not suitable for chargeback processing, wherein determining the subset of accounts that are not suitable for chargeback processing includes using the account data for the set of accounts; and
   bulk processing, using an electronic data processing device, the account data for the subset of accounts that are not suitable for chargeback processing.

2. The method of claim 1, wherein prior to determining the subset of accounts that are not suitable for chargeback processing, the method comprises:
  filtering the accessed account data to select which of the set of accounts are subjected to further processing, the filtering based on a characteristic or characteristics of one or more of the set of accounts.

3. The method of claim 2, wherein the characteristic or characteristics of one or more of the set of accounts include one or more of the number of days an account has had a negative balance, the issuer of the account, or an amount of the negative balance.

4. The method of claim 1, further comprising:
  determining a subset of accounts from the set of accounts that are suitable for chargeback processing, wherein determining the subset of accounts that are suitable for chargeback processing includes applying one or more criteria defined by an issuer of one or more of the accounts.

5. The method of claim 1, further comprising:
  determining a subset of accounts from the set of accounts that are suitable for chargeback processing, wherein determining the subset of accounts that are suitable for chargeback processing includes applying one or more criteria defined by a payment processor for transactions that are performed using one or more of the accounts.

6. The method of claim 4, further comprising:
  selecting one of the set of accounts that were not subjected to bulk processing for individual processing; and
  determining if the account selected for individual processing is eligible for chargeback processing based on application of one or more criteria defined by a payment processor for transactions performed using the account selected for individual processing.

7. The method of claim 4, wherein the issuer defined criteria include one or more of comparing the amount of the negative balance to the cost of chargeback processing, comparing the amount of the negative balance to an issuer defined minimum value, or determining if the negative balance resulted from application of a fee to the account owner.

8. The method of claim 5, wherein the criteria defined by the payment processor include one or more of determining if the selected account includes one or more transactions that are eligible for chargeback processing, determining the amount of time for which the account has had a negative balance, or determining the amount of the negative balance.

9. The method of claim 1, wherein each of the set of accounts are associated with a gift card or a payroll card.

10. The method of claim 6, wherein if the account selected for individual processing is eligible for chargeback processing, the method further comprises:
  selection of a justification for the chargeback; and
  application of a provisional credit to the account.

11. The method of claim 10, further comprising:
  determining whether application of the provisional credit to the account caused the account to have a positive, negative or zero balance;
  determining whether to provide the amount of the positive balance to the account owner if application of the provisional credit to the account caused the account to have a positive balance;
  determining whether to write-off the remaining negative balance of the account if application of the provisional credit to the account caused the account to have a negative balance; and
  selection of a justification for the write-off of the remaining negative balance if it is determined to write off the remaining negative balance.

12. An apparatus for managing account data for a set of financial instrument accounts, the apparatus comprising:
  a processor programmed to execute a set of instructions; and
  a memory coupled to the processor for storing the set of instructions that, when executed, causes the processor to execute a method comprising:
    identifying a set of financial instrument accounts that have a negative balance;
    accessing account data for the set of accounts;
      determining a subset of accounts from the set of accounts that are not suitable for chargeback processing, wherein determining the subset of accounts that are not suitable for chargeback processing includes using the account data for the set of accounts; and
    bulk processing the account data for the subset of accounts that are not suitable for chargeback processing.

13. The apparatus of claim 12, wherein prior to determining the subset of accounts that are not suitable for chargeback processing, the apparatus filters the accessed account data to select which of the set of accounts are subjected to further processing, the filtering based on a characteristic or characteristics of one or more of the set of accounts.

14. The apparatus of claim 13, wherein the characteristic or characteristics of one or more of the set of accounts include one or more of the number of days an account has had a negative balance, the issuer of the account, or an amount of the negative balance.

15. The apparatus of claim 12, further comprising:
  determining a subset of accounts from the set of accounts that are suitable for chargeback processing, wherein determining the subset of accounts that are suitable for chargeback processing includes applying one or more criteria defined by an issuer of one or more of the accounts.

16. The apparatus of claim 12, further comprising:
  determining a subset of accounts from the set of accounts that are suitable for chargeback processing, wherein determining the subset of accounts that are suitable for chargeback processing includes applying one or more criteria defined by a payment processor for transactions that are performed using one or more of the accounts.

17. The apparatus of claim 15, further comprising:
  selecting one of the set of accounts that were not subjected to bulk processing for individual processing; and
  determining if the account selected for individual processing is eligible for chargeback processing based on application of one or more criteria defined by a payment processor for transactions performed using the account selected for individual processing.

18. The apparatus of claim 15, wherein the issuer defined criteria include one or more of comparing the amount of the negative balance to the cost of chargeback processing, comparing the amount of the negative balance to an issuer defined minimum value, or determining if the negative balance resulted from application of a fee to the account owner.

19. The apparatus of claim 16, wherein the criteria defined by the payment processor include one or more of determining if the selected account includes one or more transactions that are eligible for chargeback processing, determining the amount of time for which the account has had a negative balance, or determining the amount of the negative balance.

20. The apparatus of claim 12, wherein each of the set of accounts are associated with a gift card or a payroll card.

21. The apparatus of claim 17, wherein if the account selected for individual processing is eligible for chargeback processing, the apparatus further:
determines a justification for the chargeback; and
applies a provisional credit to the account.

22. The apparatus of claim 21, wherein the apparatus further manages the account data by:
determining whether application of the provisional credit to the account caused the account to have a positive, negative or zero balance;
determining whether to provide the amount of the positive balance to the account owner if application of the provisional credit to the account caused the account to have a positive balance;
determining whether to write-off the remaining negative balance of the account if application of the provisional credit to the account caused the account to have a negative balance; and
determining a justification for the write-off of the remaining negative balance if it is determined to write off the remaining negative balance.

23. The method of claim 1,
wherein bulk processing the accessed account data includes processing multiple accounts of the subset of accounts not suitable for chargeback processing in fewer operations.

24. A method comprising:
accessing, by a processor, account data for a set of pre-paid accounts, wherein each of the set of pre-paid accounts includes a negative balance;
processing the accessed account data for the set of pre-paid accounts to determine a first subset of pre-paid accounts suitable for chargeback processing, wherein processing the accessed account data includes applying one or more issuer-defined criteria, the issuer-defined criteria including one or more of:
comparing an amount of a negative balance for an account to a cost of chargeback processing;
comparing an amount of a negative balance for an account to an issuer-defined minimum value; or
determining if a negative balance for an account resulted from application of a fee to the account; and
bulk processing the accessed account data for a second subset of pre-paid accounts in the set of pre-paid accounts, the second subset of pre-paid accounts being those accounts not suitable for chargeback processing.

25. A system comprising:
one or more processors; and
a memory coupled to the one or more processors for storing a set of instructions that, when executed, causes the one or more processors to execute a method comprising:
accessing account data for a set of pre-paid accounts, wherein each of the set of pre-paid accounts includes a negative balance;
processing the accessed account data for the set of pre-paid accounts to determine a first subset of pre-paid accounts suitable for chargeback processing, wherein processing the accessed account data includes applying one or more issuer-defined criteria, the issuer-defined criteria including one or more of:
comparing an amount of a negative balance for an account to a cost of chargeback processing;
comparing an amount of a negative balance for an account to an issuer-defined minimum value; or
determining if a negative balance for an account resulted from application of a fee to the account; and
bulk processing the accessed account data for a second subset of pre-paid accounts in the set of pre-paid accounts, the second subset of pre-paid accounts being those accounts not suitable for chargeback processing.

26. The method of claim 1, wherein determining the subset of accounts includes applying one or more criteria including one or more of:
comparing an amount of a negative balance for an account to a cost of chargeback processing;
comparing an amount of a negative balance for an account to an issuer-defined minimum value;
determining if a negative balance for an account resulted from application of a fee to the account;
determining if an account includes one or more transactions that are eligible for chargeback processing;
determining an amount of time for which an account has had a negative balance; or
determining an amount of a negative balance for an account.

* * * * *